United States Patent [19]
Loeffler et al.

[11] Patent Number: 5,791,581
[45] Date of Patent: Aug. 11, 1998

[54] TAPE RULE BLADE HOOK SHOCK ABSORBERS

[75] Inventors: Herbert H. Loeffler, Arlington, Mass.; Joseph P. DeCarolis, Bristol, Conn.

[73] Assignee: The Stanley Works, New Britain, Conn.

[21] Appl. No.: 757,913

[22] Filed: Nov. 27, 1996

[51] Int. Cl.$^6$ .................................................. B65H 75/48
[52] U.S. Cl. .................... 242/380; 33/767; 33/769; 267/165
[58] Field of Search ................ 242/380; 33/755, 33/761, 767, 768, 769; 267/148, 160, 164, 165, 166, 174, 179

[56] References Cited

U.S. PATENT DOCUMENTS

| | | |
|---|---|---|
| 2,142,387 | 1/1939 | Udell ........................... 33/767 |
| 3,255,531 | 6/1966 | Anderson . |
| 3,324,560 | 6/1967 | Snyder . |
| 3,499,612 | 3/1970 | Zelnick . |
| 3,519,220 | 7/1970 | Zelnick ........................ 242/380 |
| 3,578,259 | 5/1971 | Zelnick ...................... 242/380 X |
| 3,662,969 | 5/1972 | King . |
| 3,744,134 | 7/1973 | Zima, Jr. . |
| 3,862,761 | 1/1975 | Conley . |
| 3,889,897 | 6/1975 | Van Zelderen . |
| 4,205,448 | 6/1980 | Asai . |
| 4,479,617 | 10/1984 | Edwards . |
| 4,487,379 | 12/1984 | Dreschler et al. . |
| 4,578,867 | 4/1986 | Czerwinski et al. . |
| 4,603,481 | 8/1986 | Cohen et al. . |
| 4,748,746 | 6/1988 | Jacoff ....................... 242/379.1 X |
| 4,827,622 | 5/1989 | Makar . |
| 4,850,464 | 7/1989 | Dollar et al. ................ 267/165 X |
| 4,903,912 | 2/1990 | Couglin . |
| 4,919,403 | 4/1990 | Bartholomew ................ 267/165 |
| 4,927,124 | 5/1990 | Spedding et al. .......... 267/165 X |
| 4,982,910 | 1/1991 | Bickford . |
| 5,013,013 | 5/1991 | Spedding ..................... 267/165 |
| 5,065,988 | 11/1991 | Wedell ..................... 267/165 X |
| 5,074,534 | 12/1991 | Hoshino ................... 267/165 X |
| 5,516,085 | 5/1996 | Piepenstock .............. 267/148 X |
| 5,531,395 | 7/1996 | Hsu .............................. 33/767 X |

Primary Examiner—Donald P. Walsh
Assistant Examiner—William A. Rivera
Attorney, Agent, or Firm—Pepe & Hazard LLP

[57] ABSTRACT

A power recoilable rule has an elongated bumper for cushioning the recoil impact of the blade hook when the blade is retracted into the casing. The casing has an opening at a juncture between the bottom wall and front wall, and a bumper is mounted in the casing within the opening for linear sliding movement relative to the casing in a path along the bottom wall. The opening in the front wall and the outer end of the bumper cooperate to provide an exit aperture for the elongated blade which extends outwardly through the exit aperture and has a hook on its outer end. A shock absorbing compression spring acts between the inner end of the bumper and the housing, and it is compressed by the inward movement of the bumper to absorb energy imparted by the hook when it impacts the bumper.

15 Claims, 2 Drawing Sheets

1

TAPE RULE BLADE HOOK SHOCK ABSORBERS

BACKGROUND OF THE INVENTION

The invention relates to power returnable coilable rules and, more particularly, to a blade hook bumper assembly for cushioning the recoil impact of the blade hook when the blade is retracted into the casing.

Power returnable coilable rules which employ coiled spring motors for automatically retracting the blade back into the casing are well known. The retracting force of the spring motor must be sufficient to draw the metal blade inwardly of the casing and coil it about the spring. The rule blades have a hook secured to their free outer end which can be used to engage an object to be measured and which also prevents the blade from being fully retracted into the casing. However, after a measurement has taken place, the user simply releases the hook from engagement with the measuring surface, and the blade is allowed to be drawn at full speed into the casing until it is stopped by impact of the hook against the casing. Bumpers provided about the casing opening are used in an effort to protect the casing, but are limited in their impact energy absorption. Other rules have used braking mechanisms to slow the speed of the blade as the outer end is approaching, but these are costly. The impact of the hook on the casing or the bumper will frequently produce fatigue in the end portions of the blade, or the hook, or the fasteners which hold the hook to the blade.

Accordingly, it is an object of the present invention to provide a novel power returnable coilable metal rule incorporating a bumper assembly which is highly effective in absorbing the energy of the hook impacting upon it.

It is also an object to provide such a coilable metal rule which may be fabricated relatively economically and easily.

Another object is to provide such a coilable rule which is rugged in construction and long lived.

SUMMARY OF THE INVENTION

It has now been found that the foregoing and related objects may be readily attained in a power recoilable rule which includes a casing having side walls and a peripheral wall extending therebetween with bottom, top and end portions. The peripheral wall has an opening therein at the juncture between the bottom portion and one of the end portions, and the casing encloses an internal cavity. An elongated bumper is mounted in the casing adjacent the opening for linear sliding movement relative to the casing in a linear path along the bottom portion. The bumper has an outer end extending outwardly of the opening and is configured to provide an exit passage through the opening.

Within the cavity is an elongated coiled spring and it has an inner end secured against movement relative to the casing and an outer end. An elongated blade within the casing is coiled about the spring with its inner end connected to the outer end of the spring. The blade extends along the upper surface of the bumper and has an outer end portion disposed outwardly of the exit passage with a hook on the outer end of the blade. A shock absorbing compression spring is disposed between the inner end of the bumper and the housing in the path of movement of the bumper. It is compressible by inward movement of the bumper to absorb impact forces imparted by the impact of the hook when it strikes the outer surface of the bumper during retraction of the blade into the casing by the action of the coiled spring. Thus, the compression spring absorbs the impact forces imparted by the hook.

Desirably, there is included a guide means on the casing for guiding the bumper along the linear path, and this conveniently comprises channels provided by ribs on the side walls and by the bottom portion.

Generally, the bumper includes a body member with side portions dimensioned to slide in the channels and an energy absorbing member on the outer end formed of an elastomeric material. As a result, the hook abuts the energy absorbing portion. Conveniently, the energy absorbing member is overmolded on the body member. The body member has a planar portion and an upstanding portion adjacent the outer end, and the energy absorbing member and upstanding portion have upper surfaces cooperating with the configuration of the blade.

In one embodiment, the compression spring is a separate element having one end engaged with the bumper. Preferably, the bumper has bosses seating the one end of the spring to effect engagement thereof, and the compression spring is formed of wire with a serpentine configuration. Desirably, the compression spring is slidably disposed within guide channels in the casing slidably seating the bumper.

In another embodiment, the compression spring is integrally formed with the bumper, and in the compression spring has a plurality of compressible accordion-like formations along its length and a block on its inner end which abuts the casing. Preferably, the compression spring and the bumper are integrally formed from synthetic resin.

DETAILED DESCRIPTION OF THE PREFERRED EMBODIMENT

Figure 1:
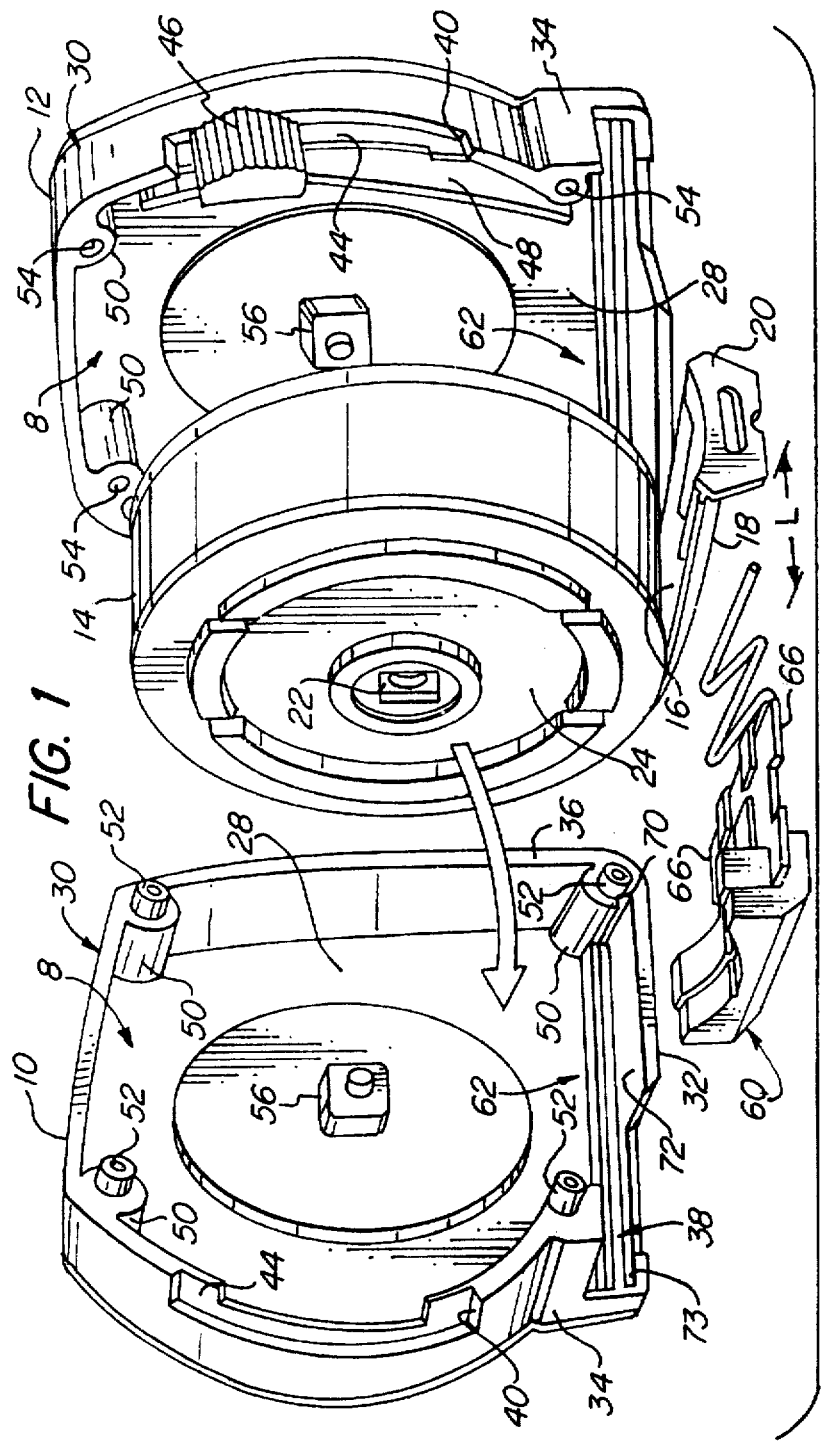
FIG. 1 is a partially exploded view of a coilable rule embodying the bumper assembly of the present invention.

Turning first to FIG. 1 of the attached drawings, therein illustrated is a partially exploded power returnable tape rule embodying the present invention. The casing for the rule is comprised of two mating sections generally designated by the numerals 10, 12 and they enclose a cavity 8 seating a spring motor/tape cartridge generally designated by the numeral 14. The cartridge 14 includes a coilable metal blade generally designated by the numeral 16 extending outwardly therefrom and having a hook 20 at its outer end. The cartridge 14 also includes the reel or spool 24 and the hub generally designated by the numeral 22 about which an elongated spring (not shown) is coiled and about which the reel 24 is rotatable.

The mating casing or housing sections 10, 12 have a side wall 28 and a peripheral wall 30 extending thereabout with a front portion 34, a rear portion 36, top portion 33, and bottom portion 32. An opening 38 is provided at the juncture between the front portion 34 and the bottom portion 32. A bumper generally designated by the numeral 60 is disposed within the opening 38 and has an outer stop surface 37 against which the hook 20 abuts. The bumper 60 is normally oriented in its at rest position so that it projects slightly beyond the front portion 34 of the casing. Also provided in the front portion 34 of the casing above the opening 38 are a notch 40 and a recessed surface 44 thereabout. When the sections 10, 12 are joined, the notches 40 in the sections 10, 12 together provide a channel in which is slidable the locking button 46 of the lock assembly generally designated by the numeral 48.

At spaced points about the casing section 10 are bosses 50 which have projecting pins 52 which seat in mating recesses 54 in the section 12 for engagement to retain the casing halves in alignment. Threaded fasteners (not shown) seat in countersunk apertures in the section 12 and threadably engage in the pins 52 of the section 10 to lock the sections 10, 12 together.

The side walls 28 of the casing sections 10, 12 have centrally disposed bosses 56 which are cooperatively configured to seat in apertures in the hub 22 to prevent rotation thereof.

Figure 2:
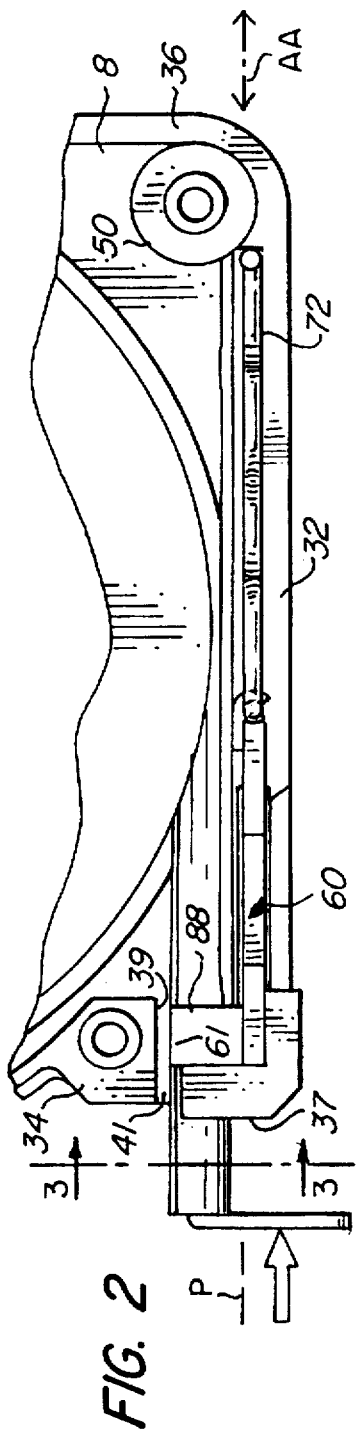
FIG. 2 is a fragmentary side elevational sectional view of the rule with one-half of the casing removed and showing the bumper assembly as it is normally seated in the casing side walls and the blade hook prior to impact thereon.
Figure 3:
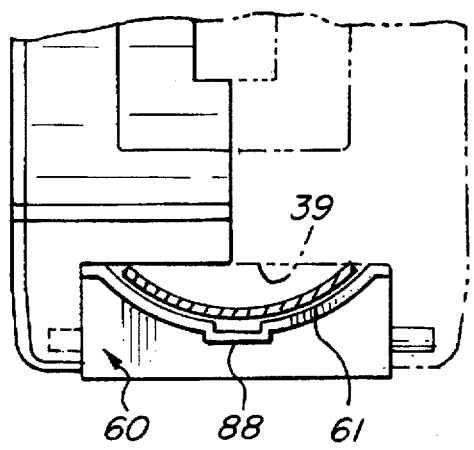
FIG. 3 is a sectional view along line 3—3 of FIG. 2.

As best illustrated in FIGS. 2 and 3, the bumper 60 also has an upper surface portion 61 which is spaced from and opposes the adjacent lower surface 39 of the front wall portion 34 of the casing. These spaced, opposed surfaces cooperate to define the exit aperture or passage 41 communicating with the cavity 8 and through which the outer end portion of the blade 16 extends. The upper surface 61 of the bumper 60 is configured to cooperate with the arcuate configuration of the blade 16 so as to allow it to pass freely through the aperture 41.

As seen in FIG. 2, the bumper 60 is moveable within the casing along a path generally shown by the arrow AA along the bottom portion 32 of the casing. For this purpose, elongated ribs 62 are formed on the inner surfaces of the side walls 28 and cooperate with the bottom portion 32 to provide channels 63 which slidably seat the side portions of the bumper 60. The bumper 60 is comprised of a generally planar plate 64, an upstanding portion 88 providing the surface 61 and an L-shaped energy absorbing outer portion 80.

A compression spring 68 is interposed between the inner end of the sliding plate 66 and an abutment surface 70 formed on the casing portions 10, 12 to absorb the energy imparted by the hook 20 when the blade 18 is retracted into the casing by the action of the coiled spring motor. In this embodiment, the compression spring 68 is a serpentine wire spring with its outer end 65 engaged with the bumper 60 and its rear end 67 abutting the abutment surface 70.

As illustrated in FIG. 2, the spring 68 is dimensioned so that its side margins seat within the channels 63. The end 65 of the spring 68 is snapped into the bosses 78 which are integrally formed on the sliding plate 66 and extend rearwardly thereof. The spring 68 has a length L which locates the blade stop surface 37 of the bumper 60 outwardly of the aperture 39 in the at rest position. The bumper 60 is limited in its movement outwardly of the casing by the shoulders 73 at the front end of the channels 63. Thus, even if the length of the compression spring 68 is somewhat longer than the length to the shoulders 73 so as to preload the spring 68, the shoulders 73 in the channels 63 will stop the bumper 60 in the desired position.

Figure 4:
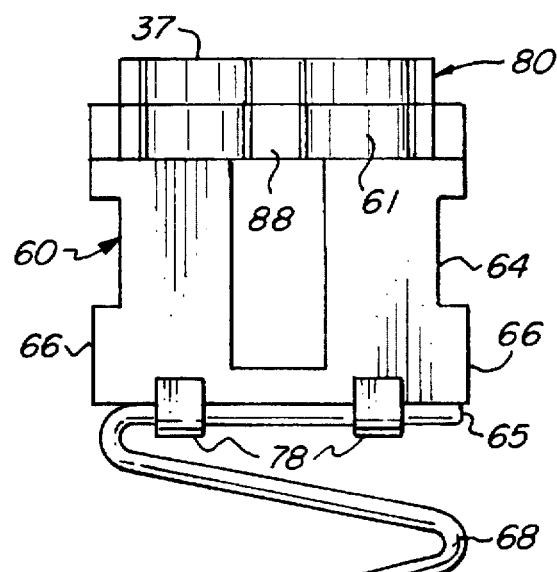
FIG. 4 is a top plan view of the bumper and compression spring assembly.
Figure 5:
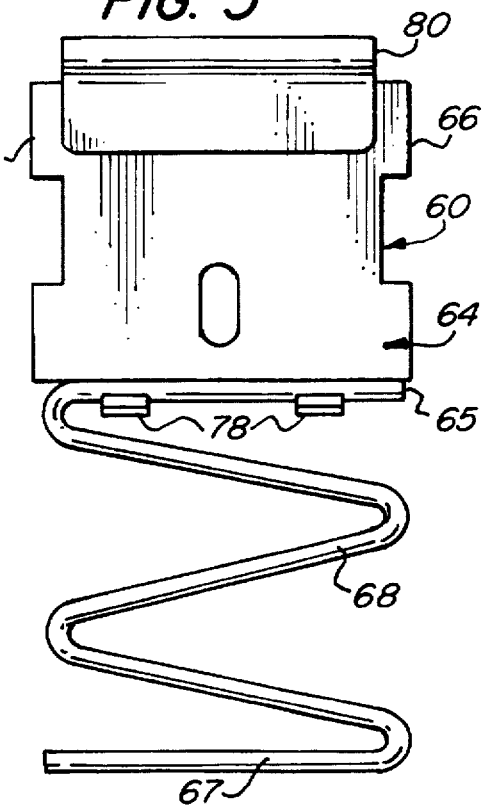
FIG. 5 is a bottom plan view of the bumper and spring assembly.

As seen in FIGS. 3 through 5, the bumper 60 of this embodiment is a multipiece structure provided by the sliding plate 64 and the energy absorbing member 80 which provides the blade stop surface 37. The sliding plate 64 has the integrally formed upstanding portion 88. A channel 20 is formed in the member 80 and portion 88 to permit passage therewithin of the fasteners 90 which connect the hook 20 to the blade 16. The sliding plate 64 and the upstanding portion 88 are formed from a rigid, high strength resin such as acetal. The energy absorbing member 80 is formed from an elastomeric material and is overmolded on the sliding plate 64.

Figure 6:
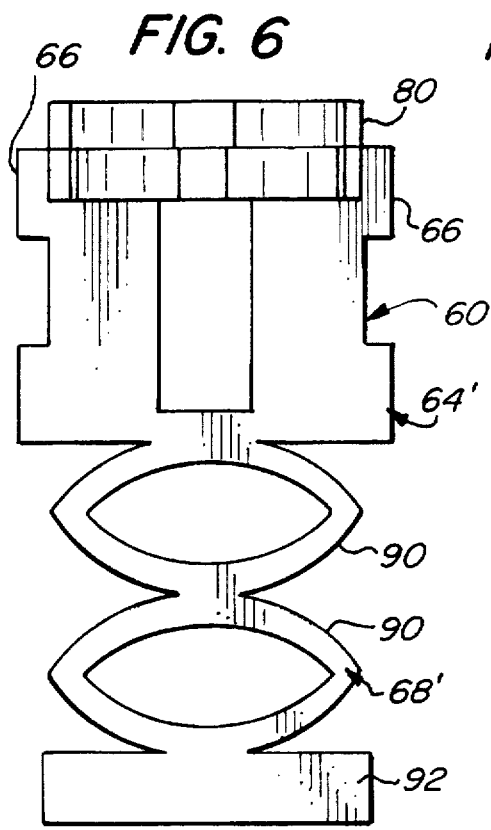
FIG. 6 is another embodiment of bumper and compression spring assembly which is integrally formed.
Figure 7:
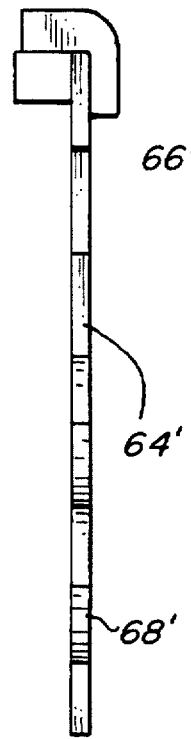
FIG. 7 is a side elevation view of the bumper and spring assembly of FIG. 6.

Referring now to FIGS. 6 and 7, an alternative embodiment of the bumper/spring construction is shown. Here the sliding plate indicated generally as 64' is integrally formed with the spring member 68'. The integrally formed compression spring portion 68' and the sliding plate 64' are disposed in a common plane and are guided in the channels 63. The compression spring portion 68' is comprised of a plurality of bellows-like accordion or pleat-like segments 90 which are integrally joined at one end to the sliding plate 64' and at the other end with the end block 92 which bears against the abutment surface 70.

Thus, it can be seen that the power returnable tape rules of the present invention may be fabricated from durable components and assembled readily to provide a long lived structure in which a bumper sets against a compression spring to absorb the impact of the blade hook.

Having thus described the invention what is claimed is:

1. A power recoilable rule comprising:

(a) a casing having side walls and a peripheral wall extending therebetween with a bottom, top and end portions, said peripheral wall having an opening therein at the juncture between said bottom portion and one of said end portions, said casing enclosing an internal cavity and having guide means comprising channels along said end walls providing a linear path extending inwardly from said opening, said channels being defined by ribs on said side walls adjacent said bottom portion of said casing;

(b) an elongated bumper mounted in said casing adjacent said opening for linear sliding movement relative to said casing in said linear path along said bottom portion, said bumper having inner and outer ends, said outer end extending outwardly of said opening and being configured to provide an exit passage through said opening, said bumper including a body member within said cavity having a planar section with side portions dimensioned to slide in said channels of said casing to provide an upstanding portion, said bumper also having a portion adjacent said outer end extending from said planar section in a direction away from said bottom portion of said casing to provide an upstanding portion, said bumper having an energy absorbing member formed of an elastomeric material on said upstanding portion;

(c) an elongated coiled spring within said cavity and having inner and outer ends, said inner end being secured against movement relative to said casing;

(d) an elongated blade within said casing coiled about said spring and having inner and outer ends, said inner end being connected to said outer end of said spring, said blade extending along the surface of said bumper spaced from said bottom portion of said casing and having said outer end disposed outwardly of said exit passage, said energy absorbing member and said upstanding portion of said bumper having a surface cooperating with the configuration of said blade;

(e) a hook on said outer end of said blade, said hook abutting said energy absorbing member on said upstanding portion; and (f) an elongated shock absorbing compression spring disposed between said inner end of said bumper and said housing in the path of movement of said bumper and compressible by inward movement of said bumper to absorb impact forces imparted by the impact of said hook when it strikes the outer surface of said bumper during retraction of said blade into said casing by the action of said coiled spring, whereby the compression spring absorbs the impact forces imparted by said hook.

2. The power recoilable rule in accordance with claim 1 wherein said energy absorbing member is overmolded on said body member.

3. The power recoilable rule in accordance with claim 1 wherein said compression spring is a separate element having one end engaged with said bumper.

4. The power recoilable rule in accordance with claim 3 wherein said bumper has bosses seating said one end of said spring to effect engagement thereof.

5. The power recoilable rule in accordance with claim 3 wherein said compression spring is formed of wire with a serpentine configuration.

6. The power recoilable rule in accordance with claim 5 wherein said compression spring is slidably disposed within guide channels in said casing slidably seating said bumper.

7. The power recoilable rule in accordance with claim 1 wherein said compression spring is integrally formed with said bumper.

8. The power recoilable rule in accordance with claim 7 wherein said compression spring has a plurality of compressible bellows-like formations along its length and a block on its inner end which abuts said casing.

9. The power recoilable rule in accordance with claim 7 wherein said compression spring and said bumper are integrally formed from synthetic resin.

10. A power recoilable rule comprising:
(a) a casing having side walls and a peripheral wall extending therebetween with a bottom, top and end portions, said peripheral wall having an opening therein at the juncture between said bottom portion and one of said end portions, said casing enclosing an internal cavity and having guide means comprising channels along said side walls providing a linear path extending inwardly from said opening, said channels being defined by ribs on said side walls adjacent said bottom portion of said casing;

(b) an elongated bumper mounted in said casing adjacent said opening for linear sliding movement relative to said casing in said linear path along said bottom portion, said bumper having inner and outer ends, said outer end extending outwardly of said opening and being configured to provide an exit passage through said opening, said bumper including a body member within said cavity having a planar section with side portions dimensioned to slide in said channels of said casing, said bumper member also having a portion adjacent said outer end extending from said planar section in a direction away from said bottom portion of said casing to provide an upstanding portion, said bumper having an energy absorbing member on said upstanding portion formed of an elastomeric material;

(c) an elongated coiled spring within said cavity and having inner and outer ends, said inner end being secured against movement relative to said casing;

(d) an elongated blade within said casing coiled about said spring and having inner and outer ends, said inner end being connected to said outer end of said spring, said blade extending along the surface of said bumper spaced from said bottom portion of said casing and having an outer end disposed outwardly of said exit passage, said energy absorbing member and said upstanding portion having a surface cooperating with the configuration of said blade;

(e) a hook on said outer end of said blade, said hook abutting said energy absorbing member on said upstanding portion; and (f) a separate shock absorbing compression spring disposed between said inner end of said bumper and a portion of said housing adjacent the other of said end portions of said casing in the path of movement of said bumper and compressible by inward movement of said bumper to absorb impact forces imparted by the impact of said hook when it strikes the outer surface of said bumper during retraction of said blade into said casing by the action of said coiled spring, whereby the compression spring absorbs the impact forces imparted by said hook.

11. The power recoilable rule in accordance with claim 10 wherein said energy absorbing member is overmolded on said body member.

12. The power recoilable rule in accordance with claim 10 wherein said compression spring is formed of wire and has a serpentine configuration, said compression spring being slidably disposed within guide channels slidably seating said bumper.

13. A power recoilable rule comprising:
(a) a casing having side walls and a peripheral wall extending therebetween with a bottom, top and end portions, said peripheral wall having an opening therein at the juncture between said bottom portion and one of said end portions, said casing enclosing an internal cavity and having guide means comprising channels along said side walls providing a linear path extending inwardly from said opening, said channels being defined by ribs on said side walls adjacent said bottom portion of said casing;

(b) an elongated bumper mounted in said casing adjacent said opening for linear sliding movement relative to said casing in said linear path along said bottom wall portion, said bumper having inner and outer ends, said outer end extending outwardly of said opening and being configured to provide an exit passage through said opening, said bumper comprising a body member within said cavity having with a planar section with side portions dimensioned to slide in said channels, said bumper member also having a portion adjacent said outer end extending from said planar section in a direction away from said bottom portion of said case to provide an upstanding portion, said bumper having an energy absorbing member on said upstanding portion at said outer end formed of an elastomeric material;

(c) an elongated coiled spring within said cavity and having inner and outer ends, said inner end being secured against movement relative to said casing;

(d) an elongated blade within said casing coiled about said spring and having inner and outer ends, said inner end being connected to said outer end of said spring, said blade extending along the surface of said bumper spaced from said bottom portion of said casing and having an outer end disposed outwardly of said exit passage, said energy absorbing member and upstanding portion having a surface cooperating with the configuration of the blade;

(e) a hook on said outer end of said blade said hook abutting said energy absorbing member on said upstanding portion; and (f) a shock absorbing compression spring disposed between the inner end of said bumper and a portion of said housing adjacent the other of said end portions of said casing in the path of movement of said bumper and compressible by inward movement of said bumper to absorb impact forces imparted by the impact of said hook when it strikes the outer surface of said bumper during retraction of said blade into said casing by the action of said coiled spring, whereby the compression spring absorbs the impact forces imparted by said hook.

14. The power recoilable rule in accordance with claim 13 wherein said compression spring has a plurality of compressible accordion-like formations along its length and a block on its inner end which abuts said casing.

15. The power recoilable rule in accordance with claim 14 wherein said compression spring and said portion of said bumper are integrally formed from synthetic resin.

* * * * *